1,941,733

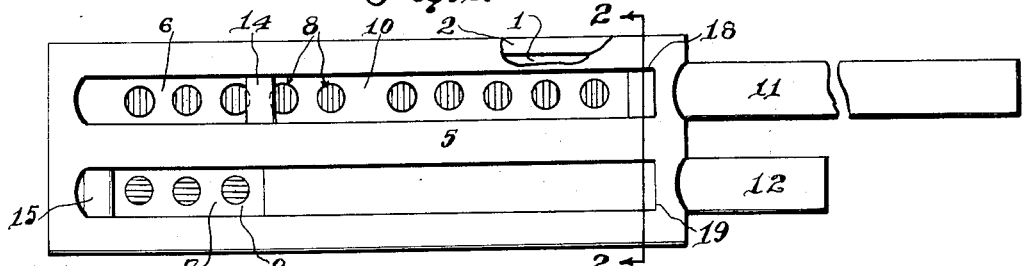
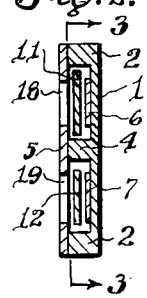
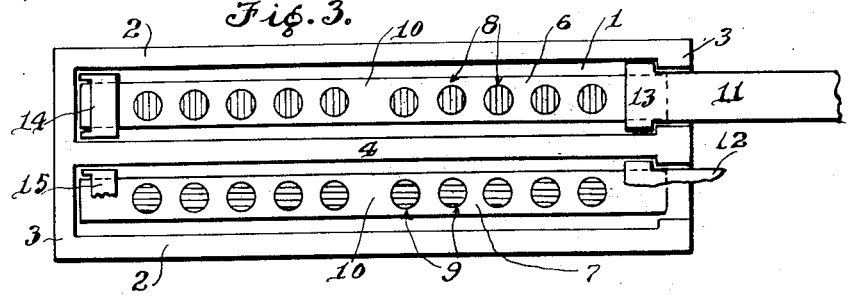
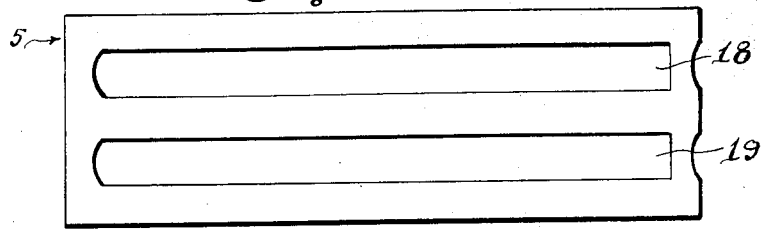
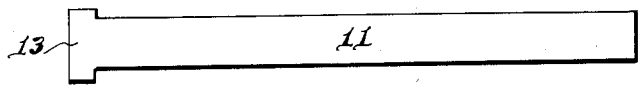
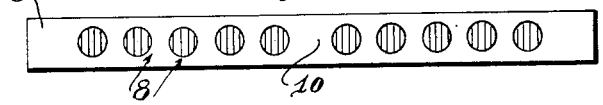
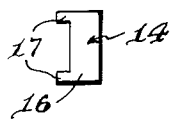
Inventor
Saul Badanes.
By J. Kaplan
Attorney Patented Jan. 2, 1934

UNITED STATES PATENT OFFICE 1,941,733

COUNTING AND CALCULATING CARD

Saul Badanes, Brooklyn, N. Y.

Application November 18, 1932
Serial No. 643,252

3 Claims. (Cl. 35—2)

This invention relates to an educational device known as a counting and calculating card for teaching arithmetic to children.

The general purpose of the improved counting card is to help the teacher carry out the initial steps of the learning process in arithmetic as a true educational process and not as a mere process of drilling children in fixed conclusions. The special purpose of the counting card is to help children learn to understand through their own self-activity the process of counting and calculating with numbers from 1 to 20.

I have found that the child at the beginning develops a number concept, at first forming its concept of one, then two, then three, etc., proceeding upward number by number. This concept is at first and best formed by the observation and counting of objects; whereafter the child forms its number concept by the total amount of names of successive numbers which it must call in to consciousness in order to reach a certain number. Its concept of ten is formed by having repeatedly called into consciousness ten names of the first ten numbers in the number scale in order to reach ten. It next acquires a number sense or power of being able to realize the number of objects in a group; and finally learns the grouping of numbers, or number facts, as by observing that two and three are five, or that twelve and three are fifteen.

The counting card helps develop in the mind of the child the most important attribute of a number of concept, namely, its serial nature. While the child is in the stage of learning to count from 1 to 10, a row of the counting card gives him a mental picture of the number scale. Children cannot calculate unless they have a mental picture of the number scale.

By means of the counting card we are able to provide a transitional stage between counting and calculating. We establish this connection between counting and calculating by adding and subtracting, first in single steps by means of ordinals.

The counting card helps the pupils understand the actual process of adding and subtracting. In working addition and subtraction with the help of the counting card the pupil is able to recognize the problem, the solution and the answer. This is made possible by the sliding pointer and the sliding cover.

With the help of the sliding pointer and the sliding cover the pupil is introduced to the plan of the structure of our decimal system. In this way he is taught to view 10 as a new unit for counting and calculating. The counting card helps separate and complete and compare every number from 1 to 10 and helps the child to understand and memorize all the addition and subtracting combinations.

The construction of the counting card has been guided by certain underlying features. The single units of the counting card are arranged into distinct and separate groups of five units each and the place of each unit from 1 to 10 can be perceived at a glance.

When the pupils first become acquainted with the counting card they become conscious of the above characteristics. The teacher helps the pupil in this way: In introducing the pupil to the counting card, attention is drawn to the first group of five in the upper row of ten dots and the place of the first dot is pointed out at the end of the group; that three is in the middle of the same group and two is at the left of the third dot and four to the right of the third dot. The same is done with the second group. Next the pupil is shown the first and sixth place at the beginning of the two groups of five; the second and seventh by their places the left of three and eight; and the fourth and ninth at the right of three and eight respectively; the fifth and tenth by their places at the end of the group of five. The teacher does the same with the second group. Constant practice in recognizing on the counting card each unit of the first ten at a glance will follow.

The counting card consists of three parts; (1) one or two rows of ten dots, each row of which is arranged into two distinctive and separate groups of five units or dots. Each row of ten can be perceived at a glance and each row provides a reliable visual memory image; (2) a sliding cover each of which moves in a groove or guide and can cover the entire row of ten dots and can uncover any desired number of dots in the row of ten; (3) a sliding pointer which moves in a groove or guide and is of such width that it can easily be placed between any two dots.

The advantage of using the counting card may be summed up as follows: First, the counting card is a device for grouping dots in such a way that their total may be clearly recognized without counting. Second, this counting device, which is a distinct, concrete, linear series, is an important step in the development of the number scale in the abstract. Third, it helps the pupil to an insight into the actual process of calculation. One of its most important functions is to give to the pupil an insight into the meaning of arithmetical operation, hence its easily divisible and movable parts. Finally, it introduces the pupil, by gradual steps to our decimal system, one of the main characteristics of which is the comprehension of ten definite units as one unit of a higher order. Thus the counting card helps the pupil at every stage where objective is needed.

The employment of the counting card is not only a help in developing number concepts, but is also indispensible in teaching addition and subtraction. The counting card is used solely as a device to help the pupil to think out the process and to get an insight into the process. Ultimately the pupils learn to get along without the counting card.

For a more general understanding of the invention, attention is now called to the drawing.

In the drawing:

Figure 1 is a front view of the counting card.

Figure 2 is a section on line 2—2 of Figure 1.

Figure 3 is a section on line 3—3 of Figure 2.

Figure 4 is a view of the front plate of the device.

Figure 5 is a view of the sliding cover strip.

Figure 6 is a view of the strip carrying the dots and

Figure 7 is a view of sliding pointer.

Referring now to the drawing in detail, numeral 1 designates the backing of the device having thickened walls 2 and 3 at the edges and in the center 4 to which is attached the front wall plate 5. Pasted to the inside of the backing as best seen in Figure 2 are two strips 6 and 7, on each of which are printed a row of dots 8 and 9. The two rows of dots are of contrasting colors. For instance, the upper row may be red and the lower row may be blue. Each row comprises ten dots formed into two groups of five each. The spaces 10 between each of the groups is relatively wider than the other spaces between the dots.

Slidably arranged between the longitudinal walls 2 are covers 11 and 12 adapted to successively cover and uncover the rows of dots. The inner ends of the covers are provided with T-shaped heads 13 so that when the covers are fully pulled out and all of the dots uncovered the shoulder portions of the said heads will strike the vertical wall 3 at the right and prevent the covers from leaving the backing.

In front of the strips 6 and 7 are slidable pointers 14 and 15 which move between the walls 2 and 4. Each of the pointers comprises a body member 16 and lower outwardly extending flange members 17 so as to give the pointers a large bearing surface. Registering with each row of dots are cutout portions 18 and 19 in the front plate member for the purpose of exposing the dots to view.

The dots on each strip are supposed to represent the series of numbers 1 to 10. These numbers occupy a very important place in our decimal system of numeration because they are the elements of which higher numbers are composed. The art of calculation consists of breaking up the series and recombining some of its members, or in other words it consists of ascending and descending the number scale.

The use of the device may be first begun by covering up all the dots by the covers 11 and 12. The pupil is taught to count, for instance, first by pulling one of the covers and exposing one dot representing the numeral 1. Then one or two additional dots are exposed and the result added. After that a few more dots are uncovered and the whole amount ascertained. Or the pupil can pull the cover out and expose to view a complete or a partial row of dots and place the sliding pointer between any group of dots and learn that the complete exposed row of dots equal to the sum of the dots on both sides of the pointer. For instance, in Figure 1 in the top row of dots the pupil can readily perceive that the three series of dots to the left of the pointer 14 added to the seven dots to the right of the pointer equals ten. Likewise the pupil can learn that subtracting the three dots at the left of the pointer from the ten dots in the row will leave seven dots appearing at the right of the pointer. By using a variety of figures or dots a great number of problems may be performed. Also the child may be taught to subtract in the like manner. The pupil may be taught to associate the dots with other objects and various calculations of the said objects may be solved in the card. For instance, a question may be asked "A boy picked five apples from a tree and three apples from another tree. How many did he pick?" In solving this problem the pupil uncovers the first five of a group of dots and then uncovers three more and adds the result and obtains the answer 8.

In beginning to study numbers above 10, the pupil crosses the first threshold of the decimal system of enumeration. The pupil is here introduced to a new idea; namely, that of considering a series of ten units as a single group. The pupil is to learn that the contents of each number from now on is determined not only by its place in the series, but also by its place in our number system. This knowledge the pupil needs in order to be able to perform calculations with numbers above ten, especially with large numbers.

The pupil may be introduced to the second decade in two ways: (1) He may add successively 1 to each number, beginning with a ten, and in this way continue the number series beyond ten; 10 plus 1 equals 11, 11 plus 1 equal 12, 12 plus 1 equals 13, 13 plus 1 equals 14, etc. Counting is then still the mode of forming numbers. Or (2) he may consider ten as a higher unit and develop each new number of the second decade by adding successively to its collective unit, ten, every member of the primary series from 1 to 10; thus 10 plus 1 equals 11, 10 plus 2 equals 12, 10 plus 3 equals 13, 10 plus 4 equals 14, 10 plus 5 equals 15, 10 plus 6 equals 16, etc. The second method is by far preferable because the pupil must grasp the decimal composition of numbers. In the second way only, then, each new number from 11 to 20 is conceived as possessing an attribute which the first ten cardinals lack; namely, each number is made up of a decade and one or more units. That is the essence of the decimal system.

Here the counting card renders a valuable service. By means of the one-ten dot system of the counting card, the pupil comprehends numbers from ten to twenty, not only as of a series, but as a plurality made up of a ten and an already familiar number; 14 is not only 1 after 13, but it is also 10 plus 4. By means of the counting card, the pupil sees objectively the merging of the number scale and the decimal system of numeration into one.

In the same manner we use the counting card to help the pupil see that the basic operations are carried over to the second decade. For instance, we wish the pupil to see that 16 plus 3 equals 19, because 6 plus 3 equals 9. With the help of the counting card, the teacher shows the pupil that 16 is built from 10 and 6 units; therefore, in order to add 3 units to 16, we simply let the 6 units grow into 9 by adding to them 3 units, the ten-group remaining unchanged. The pupil must soon learn to transfer the basic operations thoughtfully and without any objective aids. The success of addition and subtraction within the higher decades depends on getting the pupil to work thoughtfully with the second decade rather than merely using objective aids to get answers without insight into the process of the transfer of basic operations.

It will thus be seen that I have provided an apparatus for a method of teaching children the thoughtful process of counting. The counting card is deliberately planned to help the pupil to remember the number scale with clearness and certainty. The pupil substitutes this number scale for the groups of concrete objects to be added or subtracted and thus takes an important step toward the power to perform the arithmetical process mentally, i. e., without the help of objects. The counting card places in the hand of every pupil a concrete picture of the number scale. It is constructed so as to make each unit from 1 to 10 not only visible and movable but also visible at a glance. The exercises in separating, comparison, and completion further help the pupil to work conceptually with numbers.

Having described my invention, I claim:

1. A counting device comprising a backing member, a slotted front plate mounted thereon in spaced relation thereto, a row of ten dots mounted upon the backing member and visible through the slot of the front plate, said dots being spaced apart and the dots being divided into two groups of five each by a space broader than the spaces between the dots of the groups, a cover member slidable between the backing member and the front plate and being of such relative length as to cover all of the dots in the row and a pointer member slidable between the backing member and the front plate and being of such transverse breadth as to completely conceal one dot only of the row of dots.

2. A counting device comprising a backing member, marginal walls upon the backing member, a slotted plate mounted thereon in spaced relation to the backing member, a row of ten dots mounted upon the backing member and visible through the slot of the front plate, said dots being spaced apart and the dots being divided into two groups of five each by a space broader than the spaces between the dots of the groups, a cover member slidable between the backing member and the front plate and being of such relative length as to cover all of the dots in the row and a pointer member slidable between the backing member and the front plate and being of such transverse breadth as to completely conceal one dot only of the row of dots, said cover member being provided at one edge with outstanding flanges adapted to encounter the marginal wall at the end of the slot and limit the sliding movement of said cover member.

3. A counting card comprising a backing member having thickened walls at the edges and in the center, strips of indicia pasted on said backing between said thickened walls, elongated cover members slidably arranged between the edges of said thickened walls to cover and uncover said indicia, said cover members being provided at one end with outstanding flanges adapted to encounter the said thickened wall at one edge of the said backing member and a front plate attached to the faces of said thickened wall members of said backing, said front plate having slots to expose to view said indicia.

SAUL BADANES.